United States Patent
Tsuchiya

(10) Patent No.: US 10,600,176 B2
(45) Date of Patent: Mar. 24, 2020

(54) INSPECTION METHOD AND INSPECTION APPARATUS

(71) Applicant: NUFLARE TECHNOLOGY, INC., Yokohama-shi (JP)

(72) Inventor: Hideo Tsuchiya, Setagaya (JP)

(73) Assignee: NUFLARE TECHNOLOGY, INC., Yokohama-shi (JP)

( * ) Notice: Subject to any disclaimer, the term of this patent is extended or adjusted under 35 U.S.C. 154(b) by 314 days.

(21) Appl. No.: 15/605,292

(22) Filed: May 25, 2017

(65) Prior Publication Data

US 2017/0352142 A1    Dec. 7, 2017

(30) Foreign Application Priority Data

Jun. 3, 2016  (JP) ................. 2016-112198

(51) Int. Cl.
| | | |
|---|---|---|
| G06T 9/00 | (2006.01) | |
| G06T 7/00 | (2017.01) | |
| G06K 9/20 | (2006.01) | |
| G06K 9/40 | (2006.01) | |
| G06K 9/46 | (2006.01) | |
| G06K 9/62 | (2006.01) | |

(52) U.S. Cl.
CPC ............ G06T 7/001 (2013.01); G06K 9/2036 (2013.01); G06K 9/40 (2013.01); G06K 9/4661 (2013.01); G06K 9/6202 (2013.01); G06T 2207/10061 (2013.01); G06T 2207/30148 (2013.01)

(58) Field of Classification Search
CPC ........... G06T 7/001; G06T 2207/10061; G06T 2207/30148; G06K 9/2036; G06K 9/40; G06K 9/4661; G06K 9/6202
See application file for complete search history.

(56) References Cited

U.S. PATENT DOCUMENTS

| | | | | |
|---|---|---|---|---|
| 2012/0141012 A1* | 6/2012 | Sakai | ................. | G01N 21/9501 382/149 |
| 2014/0314304 A1* | 10/2014 | Inoue | ..................... | G06T 7/001 382/145 |
| 2015/0332452 A1* | 11/2015 | Tsuchiya | ............... | G06T 7/0004 382/147 |

FOREIGN PATENT DOCUMENTS

| | | |
|---|---|---|
| JP | 2007-3459 | 1/2007 |
| JP | 2012-26977 | 2/2012 |
| JP | 2013-40873 | 2/2013 |
| JP | 2013-174575 | 9/2013 |
| JP | 2014-77732 | 5/2014 |
| JP | 2014-181966 | 9/2014 |

(Continued)

*Primary Examiner* — Ping Y Hsieh

(74) *Attorney, Agent, or Firm* — Oblon, McClelland, Maier & Neustadt, L.L.P.

(57) ABSTRACT

An inspection method according to the embodiments includes applying light of a light source to an inspection target; receiving light from the inspection target to obtain a first image of the inspection target by a sensor; based on an image of a first pattern comprising repetitive patterns unresolvable with a wavelength of the light source in the first image, calculating a deviation of luminance values with respect to each of first regions in the first pattern by a processor; obtaining a second image of the inspection target by the sensor; correcting luminance values of the second image by the processor based on the deviations of the luminance values; and comparing the repetitive patterns of the corrected second image with each other by a comparer.

16 Claims, 7 Drawing Sheets

(56) References Cited

FOREIGN PATENT DOCUMENTS

JP 2015-232549 12/2015

\* cited by examiner

INSPECTION METHOD AND INSPECTION APPARATUS

CROSS REFERENCE TO RELATED APPLICATIONS

This application is based upon and claims the benefit of priority from the prior Japanese Patent Application No. 2016-112198, filed on Jun. 3, 2016, the entire contents of which are incorporated herein by reference.

FIELD

The embodiments of the present invention relate to an inspection method and an inspection apparatus.

BACKGROUND

The NIL (NanoImprint Lithography) technology has been developed as a technique that enables to form a microstructure of a semiconductor. In order to inspect a template of the NIL technology, an image of the template is taken with a SEM (Scanning Electron Microscope) and a shape defect such as a rupture or a bridge (short-circuit) in the microstructure or a critical defect such as a thickening or thinning of the line width is detected. Defect detection with a wafer inspection apparatus using a structure actually transferred on a wafer is also performed.

However, in these methods, imaging takes a long time, or a detected defect cannot be always determined as a defect of the template because a result having subjected to a manufacturing process on a wafer is inspected. Therefore, these methods have a problem when used for the template inspection on a full scale.

Meanwhile, trials of imaging a template with an inspection apparatus used in an inspection of a photomask and detecting a defect on the template based on the image have been conventionally performed (see Patent Literature 1, for example). In a current downscaled technology node, the dimension of the microstructure of a template is minuter than a light source wavelength of the inspection device and the inspection device cannot resolve the microstructure.

That is, when an image is taken with the inspection apparatus, a microstructure of a template that is periodically repeated as in a memory cell region is not resolved and is observed to have substantially uniform luminance of a gray level between a white level and a black level. If such a microstructure that is periodically repeated has a defect, the periodicity of repetitive patterns in an image of the microstructure is disturbed and a luminance change occurs in the image of the gray level according to the degree of the defect. The inspection apparatus detects such a luminance change caused by disturbance in the periodicity based on comparison between images, thereby detecting a defect in the microstructure that is unresolvable.

However, the luminance values of the gray level change according to the dimension of the repetitive patterns or the dimensional ratio thereof. Therefore, if the dimension or the dimensional ratio of the repetitive patterns varies within the plane of a template, the luminance values of the gray level also fluctuate correspondingly. In this case, the gray level serving as a reference differs between comparison images, which causes a problem that it is difficult to detect a defect.

SUMMARY

An inspection method according to the embodiments includes applying light of a light source to an inspection target; receiving light from the inspection target to obtain a first image of the inspection target by a sensor; based on an image of a first pattern comprising repetitive patterns unresolvable with a wavelength of the light source in the first image, calculating a deviation of luminance values with respect to each of first regions in the first pattern by a processor; obtaining a second image of the inspection target by the sensor; correcting luminance values of the second image by the processor based on the deviations of the luminance values; and comparing the repetitive patterns of the corrected second image with each other by a comparer.

The deviation of the luminance values of each of the first regions may be a difference between a luminance average value of each of the first regions in the first image and a luminance average value of the first pattern in the first image.

The correcting luminance values of the second image may be subtracting deviations of luminance values of the first pattern from luminance values of the first pattern in the second image.

The method may further include calculating correction values by inverting signs of deviations of luminance values in the first pattern, wherein correcting luminance values of the second image may be adding the correction values to luminance values of the first pattern in the second image.

The first image may include the first pattern and a second pattern resolvable with the light of the light source, and deviations of luminance values in the first pattern may be calculated after extracting luminance values of the first pattern from the first image or eliminating the second pattern from the first image.

The first and second patterns may include second regions arranged to be periodically repeated, and in comparing the repetitive patterns with each other, comparison of each of the first and second patterns may be performed with respect to each of the second regions, comparison of the first pattern may be performed using the second image corrected, and comparison of the second pattern may be performed using the second image uncorrected.

The method may further include comparing between luminance of a first repetitive pattern and luminance of a second repetitive pattern in the second image corrected, and determining that the inspection target has a defect when a luminance difference between the first repetitive pattern and the second repetitive pattern or a differential value of the luminance difference is larger than a first threshold.

A size of the first regions may be smaller than that of the repetitive patterns and larger than that of pixels of the sensor.

The inspection target may be determined to have a defect, luminance values of the second image may not be corrected, and the repetitive patterns may not be compared when the deviations of the luminance values are larger than a second threshold.

An inspection method according to the embodiments includes: applying light of a light source to an inspection target; receiving light from the inspection target to obtain a first image of the inspection target by a sensor; based on an image of a first pattern comprising repetitive patterns unresolvable with a wavelength of the light source in the first image, calculating a maximum value, a minimum value, and an average value of luminance values with respect to each of predetermined regions in the first pattern; obtaining a second image of the inspection target by the sensor; correcting luminance values of the second image by a processor based on the maximum value, the minimum value, and the average value of the luminance values with respect to each of the predetermined regions; and comparing the repetitive patterns of the corrected second image with each other by a comparer.

The processor may correct luminance values of the second image of the inspection target to substantially match maximum values of luminance values of the repetitive patterns compared by the comparer, substantially match minimum values of the luminance values of the repetitive patterns, and substantially match average values of the luminance values of the repetitive patterns.

The first image of the inspection target may include the first pattern and a second pattern resolvable with the light of the light source, and the processor may calculate the maximum value, the minimum value, and the average value of the luminance values with respect to each of the predetermined regions after extracting luminance values of the first pattern from the first image of the inspection target or eliminating the second pattern from the first image of the inspection target.

A pixel size of the first image may be larger than that of the second image.

An inspection apparatus according to the embodiments include an optical system applying light to an inspection target; a sensor receiving light from the inspection target to obtain an image of the inspection target; a processor calculating, based on an image of a first pattern comprising repetitive patterns unresolvable with a wavelength of a light source of the optical system in the image of the inspection target, a deviation of luminance values with respect to each of first regions in the first pattern, the processor correcting luminance values of the image of the inspection target based on the deviations of the luminance values; and a comparer comparing the repetitive patterns of the corrected image with each other.

The deviation of the luminance values of each of the first regions may be a difference between a luminance average value calculated for each of the first regions and a luminance average value of the first pattern in the image of the inspection target.

The correcting luminance values of the image of the inspection target may be subtracting deviations of luminance values of the first pattern from luminance values of the first pattern in the image of the inspection target, or adding correction values obtained by inverting signs of the deviations of the luminance values of the first pattern to the luminance values of the first pattern in the image of the inspection target.

The apparatus may further include a storage storing therein deviations of luminance values of the first pattern or correction values obtained by inverting signs of the deviations of the luminance values of the first pattern along with positional information.

The image of the inspection target may include the first pattern and a second pattern resolvable with the light of the light source, and the processor may calculate deviations of luminance values in the first pattern after extracting luminance values of the first pattern from the image of the inspection target or eliminating the second pattern from the image of the inspection target.

The processor and the comparer may not correct the luminance values of the image of the inspection target, may determine that the inspection target has a defect, and may not compare the repetitive patterns when the deviations of the luminance values are larger than a second threshold.

An inspection apparatus includes an optical system applying light to an inspection target; a sensor receiving light from the inspection target to obtain an image of the inspection target; a processor calculating, based on an image of a first pattern comprising repetitive patterns unresolvable with a wavelength of a light source of the optical system in the image of the inspection target, a maximum value, a minimum value, and an average value of luminance values in the first pattern, the processor correcting luminance values of the image of the inspection target based on the maximum value, the minimum value, and the average value of the luminance values in the first pattern; and a comparer comparing the repetitive patterns of the corrected image with each other.

DETAILED DESCRIPTION

Embodiments will now be explained with reference to the accompanying drawings. The present invention is not limited to the embodiments.

(First Embodiment)

Figure 1:
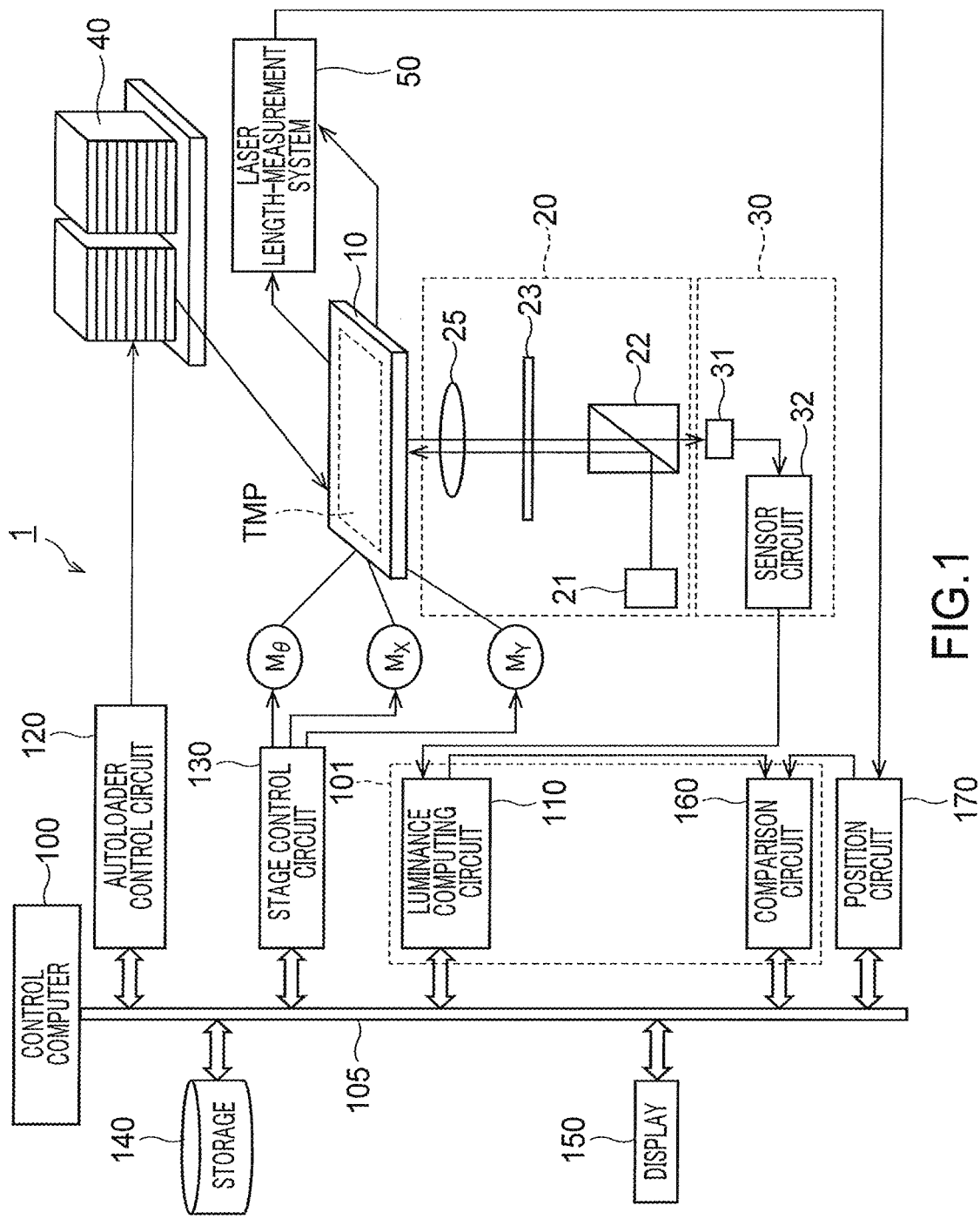
FIG. 1 illustrates an example of a configuration of an inspection apparatus according to a first embodiment.

FIG. 1 illustrates an example of a configuration of an inspection apparatus according to a first embodiment. An inspection apparatus 1 is an apparatus that optically images a template TMP to be used in the NIL technology and detects a defect on the template TMP. The inspection apparatus 1 can be applied to an inspection of a mask in an EUV (Extreme Ultraviolet) lithography technology.

The inspection apparatus 1 includes a stage 10, an optical system 20, an image capturing system 30, an autoloader 40, a laser length-measurement system 50, a control computer 100, a luminance computing circuit 110, an autoloader control circuit 120, a stage control circuit 130, a storage 140, a display 150, a comparison circuit 160, a position circuit 170, and motors $M_\theta$, $M_x$, and $M_y$. The luminance computing circuit 110 and the comparison circuit 160 can be configured as one computing circuit 101. The stage 10 can have a template TMP as an inspection target placed thereon and can be relatively moved with respect to the optical system 20 by the motors $M_\theta$, $M_x$, and $M_y$. For example, the motor $M_\theta$ moves the stage 10 in a rotation direction (a θ direction) within a substantially horizontal plane. The motors $M_x$ and $M_y$ move the stage 10 in an X direction and a Y direction, respectively, within the substantially horizontal plane. The motors $M_\theta$, $M_x$, and $M_y$ moving the stage 10 enable the template TMP on the stage 10 to be scanned with light from the optical system 20.

The optical system 20 includes a light source 21, a polarizing beam splitter 22, a half-wave plate 23, and an objective lens 25. The light source 21 generates light to be applied to the template TMP. The polarizing beam splitter 22 reflects the light from the light source 21 to the template TMP and transmits reflection light reflected from the template TMP to the image capturing system 30. The half-wave plate 23 provides a phase difference to a polarization plane of light from the template TMP. Light transmitted through the half-wave plate 23 is focused on the template TMP to irradiate the template TMP. The light reflected on the template TMP passes through the objective lens 25, the half-wave plate 23, and the polarizing beam splitter 22 to be received by the image capturing system 30. The inspection apparatus 1 is a reflective inspection apparatus that receives the reflection light from the template TMP with the image capturing system 30 to obtain an optical image. However, the inspection apparatus 1 can be a transmissive inspection apparatus that receives light transmitted through the template TMP with the image capturing system 30 to obtain an optical image.

The image capturing system 30 includes an image sensor 31 and a sensor circuit 32 and receives the light from the template TMP to obtain an image of the template TMP. The image sensor 31 receives the light from the optical system 20 and converts (photoelectric converts) the optical signal into an electrical signal. The image sensor 31 can be, for example, a line sensor including imaging elements such as photodiodes arranged in a line, or an area sensor including imaging elements arranged two-dimensionally in a plane. For example, the image sensor 31 can be a CCD (Charge Coupled Device). The sensor circuit 32 performs A/D (Analog-Digital) conversion of the electrical signal from the image sensor 31 to obtain an optical image. As explained later, this image is transmitted to the luminance computing circuit 110 and is used to obtain a deviation of luminance tone values (hereinafter, simply "luminances" or "luminance values"), or is transmitted to the comparison circuit 160 and is used in comparison processing at the time of detection of a defect on the template TMP.

The autoloader 40 automatically transports the template TMP onto the stage 10 or automatically recovers the template TMP on the stage 10 according to a command from the autoloader control circuit 120.

The laser length-measurement system 50 detects positions of the stage 10 in the X direction and the Y direction and transmits positional information of the stage 10 to the position circuit 170.

The control computer 100 executes various types of control related to a defect inspection of the template TMP. The control computer 100 is connected to the luminance computing circuit 110, the autoloader control circuit 120, the stage control circuit 130, the storage 140, the display 150, the comparison circuit 160, and the position circuit 170 via a bus 105. The storage 140 has information necessary for a defect inspection of the template TMP, defect data obtained by the defect inspection, and the like stored therein. The display 150 displays a defect image of the template TMP, coordinate data, and the like.

The autoloader control circuit 120 controls the autoloader 40 to transport the template TMP in the manner described above. The stage control circuit 130 controls the motors $M_\theta$, $M_x$, and $M_y$ to appropriately operate the stage 10.

The position circuit 170 detects the position of the stage 10 in corporation with the laser length-measurement system 50. The positional information of the stage 10 detected by the position circuit 170 is fed back to the stage control circuit 130. The stage control circuit 130 controls the motors $M_\theta$, $M_x$, and $M_y$ to correctly move the stage 10. The positional information of the stage 10 is transmitted also to the comparison circuit 160. The comparison circuit 160 associates the positional information of the stage 10 with defect data obtained by comparison processing and stores the associated data in the storage 140. This enables the display 150 to display the position of the defect data of the template TMP.

The luminance computing circuit 110 receives the image of the template TMP from the sensor circuit 32 and calculates deviations of luminance values of an image of repetitive patterns that are too minute to be resolved with the wavelength of the light source 21. The luminance computing circuit 110 corrects an image of the template TMP taken again based on the deviations of the luminance values. The luminance computing circuit 110 transmits the corrected image to the comparison circuit 160 when the comparison circuit 160 performs comparison of the image of the template TMP.

The comparison circuit 160 receives the corrected image of the template TMP and performs comparison of the repetitive patterns by a die-die comparison method using the corrected image. In order to realize the functions explained above, the luminance computing circuit 110 and the comparison circuit 160 can be constituted of logic circuits or can be constituted of a CPU and programs. The luminance computing circuit 110 and the comparison circuit 160 can be combined as one computing circuit 101. Some of the functions of the luminance computing circuit 110 can be incorporated into the comparison circuit 160 or some of the functions of the comparison circuit 160 can be incorporated into the luminance computing circuit 110. More detailed functions of the luminance computing circuit 110 and the comparison circuit 160 will be explained later.

The template TMP to be inspected is explained below. The template TMP used in the NIL technology has a mesa structure protruding from the surface of a glass substrate. A circuit pattern is formed on the mesa structure and the surface of the mesa structure is pushed onto a resist formed on a wafer to transfer the circuit pattern onto the resist. Therefore, the circuit pattern on the template TMP needs to be formed in a dimension of the same magnification as that of the dimension of the circuit pattern to be transferred onto the resist. For example, the line width and the space width of a line and space pattern are each formed in about a dozen nanometers to about several tens of nanometers, and the engraving depth of the spaces (the distance between the surface of the line pattern and the surface of the space pattern) is formed in about several tens of nanometers to about 100 nanometers.

When such a template TMP is to be inspected, the inspection apparatus uses light of a wavelength of about 200 nanometers, which is close to the light source wavelength of a stepper, for example. However, as described above, if the circuit pattern on the template TMP is minuter than the wavelength of the light source of the inspection apparatus 1, the inspection apparatus 1 cannot resolve the circuit pattern. The minimum diameter of a pattern that is resolvable with light of a certain wavelength is generally known as a Rayleigh resolution limit. When the resolution is R, the Rayleigh resolution limit is represented by Expression 1.

[Formula 1]

$$R = k_1 \frac{\lambda}{NA} \qquad \text{(Expression 1)}$$

In this expression, $\lambda$ is the wavelength of the light of the light source 21, NA is the number of apertures, and $k_1$ is the coefficient depending on a focusing condition. NA is a value between about 0.7 to about 0.8 and $k_1$ is a value between about 0.5 and about 1. For example, when NA=0.7, $k_1$=0.5, and $\lambda$=200 nanometers, the resolution limit dimension R is 143 nanometers. That is, if the line width or the space width becomes smaller than 143 nanometers, the light of the wavelength of 200 nanometer cannot provide a sufficient luminance amplitude corresponding to the pattern and cannot resolve the pattern. Such a minute pattern that is unresolvable with the light of the inspection apparatus 1 is hereinafter also referred to as "non-resolving pattern". Meanwhile, a pattern that is resolvable with the light of the inspection apparatus 1 is hereinafter also referred to as "resolving pattern".

When a non-resolving pattern is a periodic (regular) repetitive pattern, an image taken by the image capturing system 30 has substantially uniform luminance values of a gray level between a white level and a black level and becomes a substantially flat gray pattern. The white level is, for example, a luminance level obtained when a flat portion (margin portion) including no pattern on the template TMP is imaged. The black level is, for example, a luminance level obtained in a state (light shielded state) in which the light from the light source 21 is shielded by a shutter (not illustrated) or the like.

For example, a periodic repetitive pattern is used frequently for a memory cell region of a semiconductor memory device. The memory cell region often has a size downscaled to be smaller than the Rayleigh resolution limit. Therefore, a pattern on the template TMP used for formation of the memory cell region becomes a non-resolving pattern periodically repeated. When the image capturing system 30 images this non-resolving pattern of the template TMP, the obtained image becomes a gray pattern with a relatively-small luminance amplitude.

When a periodical repetitive pattern is a line and space pattern, the luminance values of the gray pattern of the image change according to fluctuation in the pattern dimension or the dimensional ratio such as the line width, the space width, the duty ratio (the line width/the space width), and the aspect ratio (the engraving depth of the space pattern/the space width). For example, when the line width is enlarged and the duty ratio is increased, the luminance values of the gray pattern become closer to those of the white level. On the other hand, when the line width is narrowed and the duty ratio is decreased, the luminance values of the gray pattern become closer to those of the black level.

When the periodical repetitive pattern is a hole pattern or a pillar pattern, the luminance values of the gray pattern of the image changes according to fluctuation in the dimension such as the hole diameter or the pillar diameter.

Because same patterns are periodically arranged on these repetitive patterns, the image ideally has substantially uniform luminance values on the entire region of the repetitive patterns. However, the dimension and the dimensional ratio of the repetitive patterns actually vary within the plane of the template TMP in some cases. That is, the dimension and the dimensional ratio of the repetitive patterns have an in-plane distribution (in-plane deviations). In this case, the luminance values of the image also fluctuate according to the in-plane deviations of the dimension or the dimensional ratio. An example of the in-plane deviations of the luminance values of the image is illustrated in FIG. 2.

Figure 2:
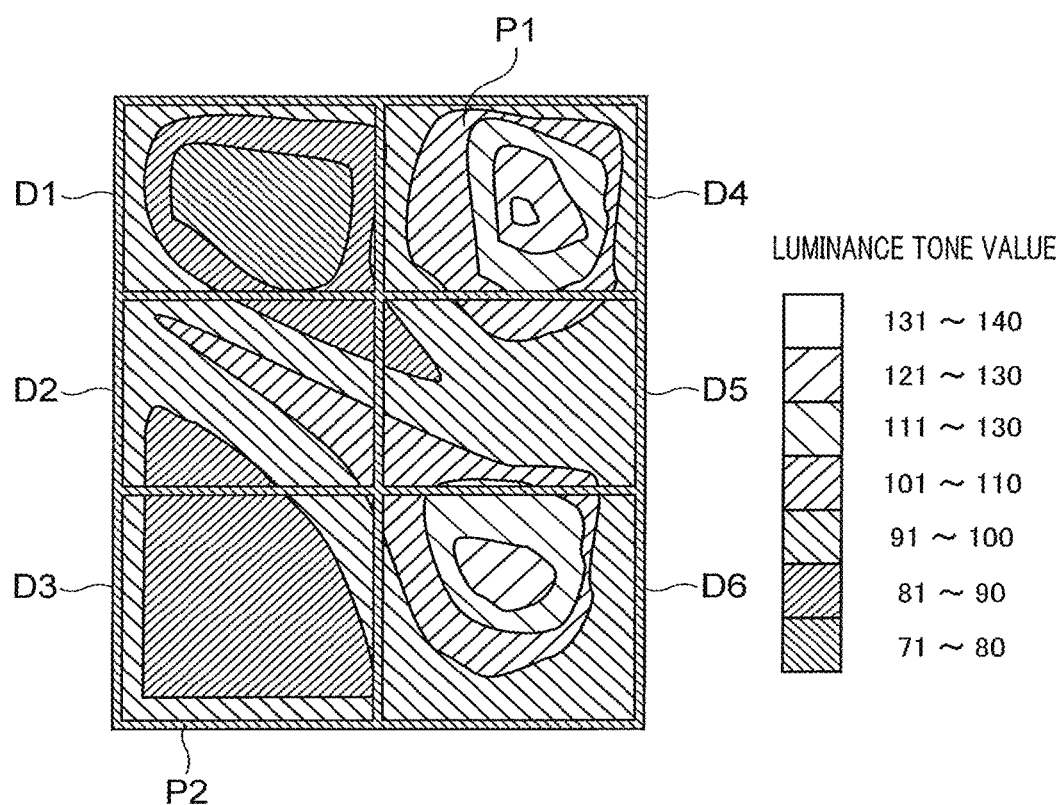
FIG. 2 is a schematic diagram illustrating an example of an in-plane luminance distribution of the template TMP.

FIG. 2 is a schematic diagram illustrating an example of an in-plane luminance distribution of the template TMP. This in-plane luminance distribution is a distribution of luminance values of an image obtained when a first pattern P1 in the template TMP is imaged. The first pattern P1 includes non-resolving patterns periodically repeated and is divided into six dies D1 to D6. The dies D1 to D6 are units (second regions) periodically repeated and are formed to have the same pattern. Therefore, the dies D1 to D6 can correspond to semiconductor chips, respectively. However, the dies D1 to D6 are not limited thereto and can be arbitrary repetitive patterns. The dies D1 to D6 become units for comparison when compared by the comparison circuit 160.

In the example illustrated in FIG. 2, the luminance values are lower (closer to those of the black level) in the dies D1 and D3 and the luminance values are higher (closer to those of the white level) in the dies D4 and D6. Therefore, it is estimated that, for example, the duty ratio (the line width/the space width) of the line and space pattern in the first pattern P1 is relatively low on the sides of the die D1 and the die D3 and is relatively high on the sides of the die D4 and the die D6.

In this way, the dimension or the dimensional ratio of the repetitive pattern formed actually on the template TMP varies within the first pattern P1 and accordingly the luminance values of the image of the first pattern P1 also fluctuate within the plane. That is, the luminance values of the image being the gray pattern in the first pattern P1 has in-plane deviations.

If the luminance values of the gray pattern have in-plane deviations, the gray level serving as a reference when dies are compared by the die-die comparison method differs between comparison images. Therefore, it is difficult to detect a defect by simple image comparison.

Accordingly, before the dies are compared by the comparison circuit 160, the inspection apparatus 1 according to the first embodiment images the first pattern P1 of the template TMP, obtains an in-plane luminance distribution from the luminance values of the image of the first pattern P1, and calculates a deviation of the luminance values with respect to each frame F (first region) based on the in-plane luminance distribution to obtain a luminance deviation map of the first pattern P1. Further, the inspection apparatus 1 images the first pattern P1 of the template TMP again and corrects the image of the first pattern P1 imaged again based on the deviations of the luminance values in the luminance deviation map. The dies are compared using the image corrected in this manner.

An operation of the inspection apparatus 1 is explained in more detail below.

Figure 3:
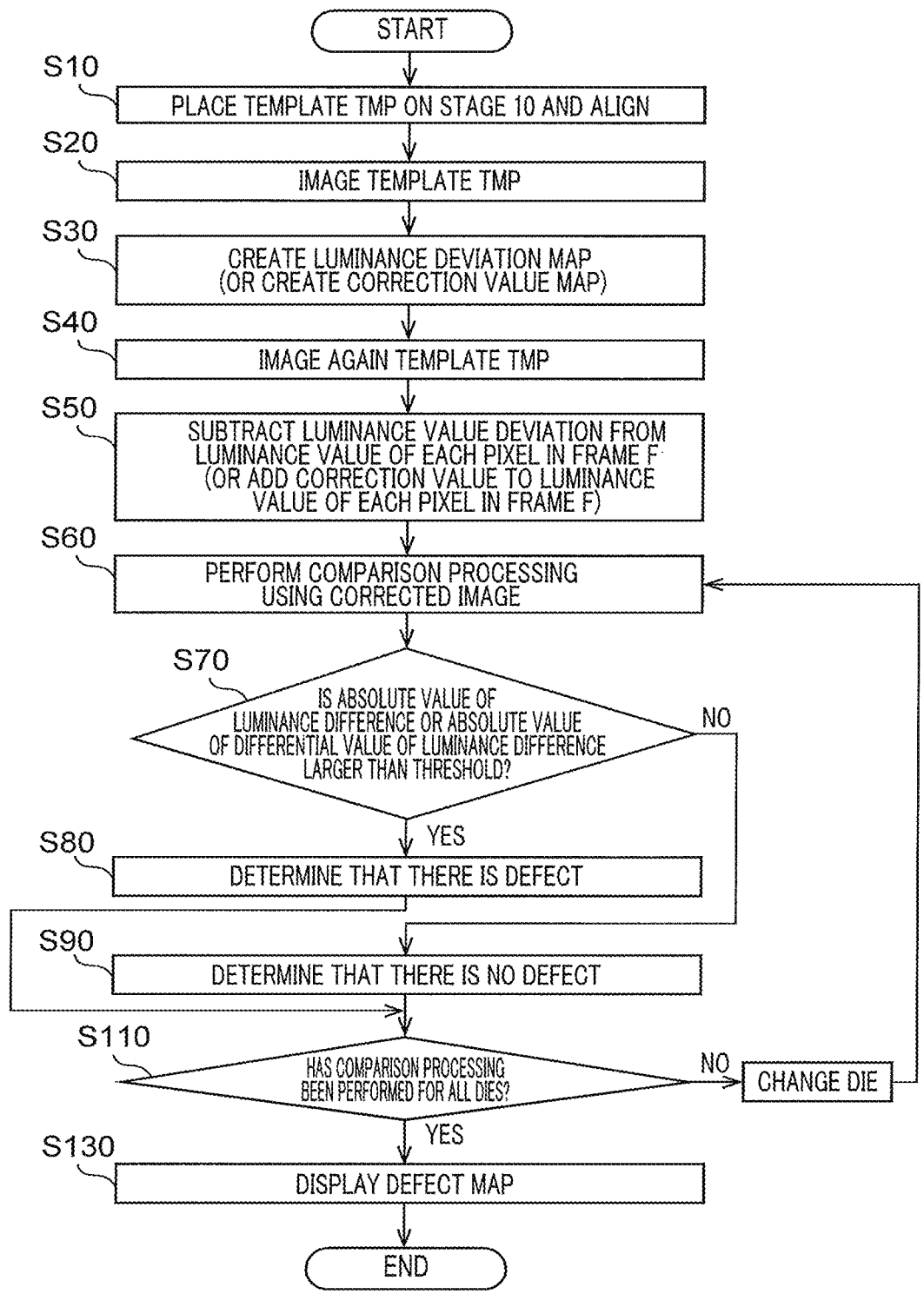
FIG. 3 is a flowchart illustrating an example of the operation of the inspection apparatus 1 according to the first embodiment.

FIG. 3 is a flowchart illustrating an example of the operation of the inspection apparatus 1 according to the first embodiment.

First, a template TMP is placed on the stage 10 and plate rotation alignment of the template TMP is performed (Step S10). In a typical case, alignment marks located in horizontal and vertical positional relations are provided on the template TMP at positions not affecting the operations of circuits, such as four corners of an outer-circumferential scribe line region. Plate alignment is an operation of aligning an X coordinate axis and a Y coordinate axis of an inspection target pattern on a transfer surface of the template TMP with a parallel direction and a perpendicular direction of a traveling axis of the stage 10, respectively, using the alignment marks. This normalizes a rotation or expansion/contraction error of the inspection target pattern on the template TMP with respect to the optical system 20 of the inspection apparatus 1.

Optimization of the light intensity amplitude (dynamic range) of the image sensor 31 is also performed. For example, the dynamic range between the black level obtained when imaging is performed in a light shielded state and the white level obtained when a flat surface of the template TMP including no patterns is imaged is adjusted.

Figure 4:
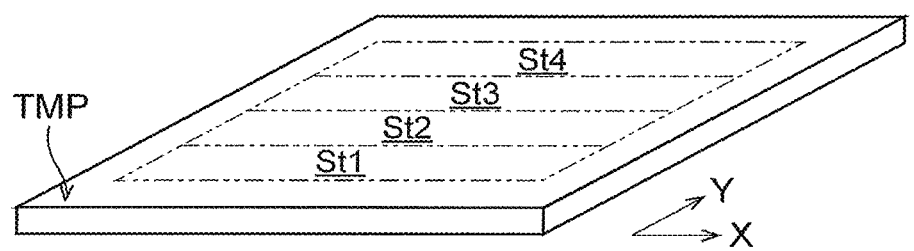
FIG. 4 illustrates an example of stripes being units for imaging.

Next, the template TMP is imaged to obtain an in-plane luminance distribution of the first pattern P1 (Step S20). FIG. 4 illustrates an example of stripes being units for imaging. The template TMP is conceptually divided into stripes St1 to St4 being the units for imaging. The stripes St1 to St4 include a plurality of repetitive patterns of the first pattern P1 and/or a second pattern P2. The first pattern P1 is explained below and the second pattern P2 will be explained later in "Mixed pattern including resolving pattern and non-resolving pattern". The image capturing system 30 obtains an image of each of the stripes (St1 to St4) while moving the template TMP. For example, while continuously moving the stage 10 in the X direction, the image capturing system 30 scans the stripe St1 to obtain an optical image of the stripe St1. Next, the stage 10 is moved in the Y direction to move the image capturing system 30 to the stripe St2. While continuously moving the stage 10 in the reverse direction of the X direction, the image capturing system 30 scans the stripe St2 to obtain an optical image of the stripe St2. In this way, the image capturing system 30 scans the stripes St1 to St4 to obtain an image (first image) of the entire template TMP. The in-plane luminance distribution illustrated in FIG. 2 is obtained in this manner.

Subsequently, the luminance computing circuit 110 calculates a luminance average value of each frame F (first region) in FIG. 5 to create a luminance deviation map (Step S30). The luminance deviation map is a map indicating a deviation of the luminance value for each frame F in the region of the first pattern P1. At this time, the luminance computing circuit 110 extracts the luminance values of the first pattern P1 from the image and then calculates the average value of luminances of respective pixels in the frame F, or eliminates the second pattern P2 from the image and then calculates the average value of luminances of respective pixels in the frame F. A deviation between the average of all luminance values in the first pattern P1 and the luminance value of each frame F is calculated with respect to each frame F. The deviation of the luminance value of each frame F is stored in the storage 140 together with the position coordinates. In this way, the luminance deviation map is stored in the storage 140. When a correction value obtained by inverting the sign of the deviation of the luminance value is used, a correction value map is stored in the storage 140.

The calculation of the deviation of the luminance value is explained in more detail.

Figure 5:
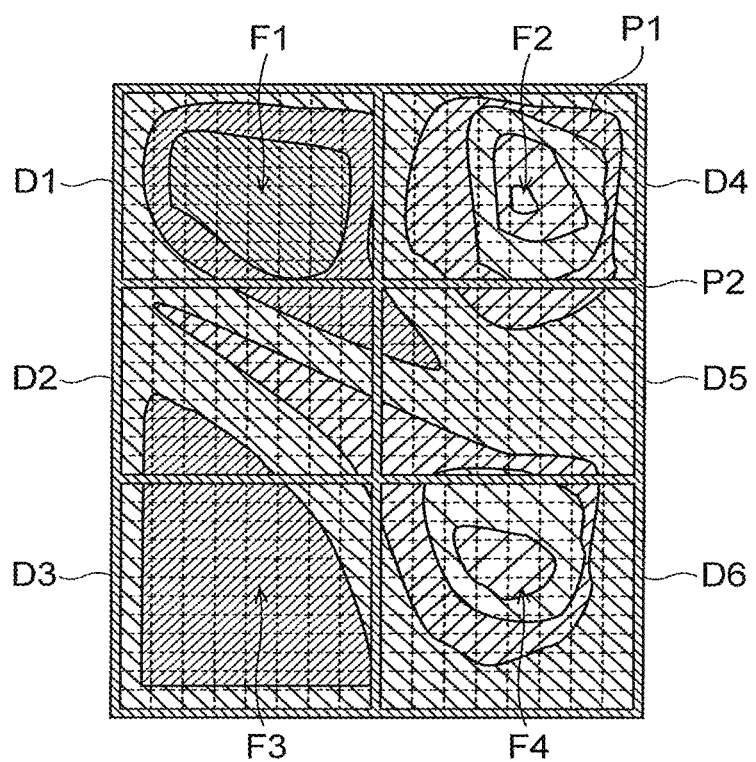
FIG. 5 is a conceptual diagram illustrating an example of a mesh and frames.

FIG. 5 is a conceptual diagram illustrating an example of a mesh and frames. As illustrated in FIG. 5, the luminance computing circuit 110 virtually partitions the gray pattern with a mesh M and calculates the average value of luminances with respect to each of squares (frames F) of the mesh M. While the size of the frames F as the first regions can be arbitrarily set, the size is at least larger than the pixel size of the image sensor 31 and is equal to or smaller than the dies D1 to D6. For example, the size of the frames F can be set according to the pixel size of the image sensor 31. When the pixel size is, for example, 50 nanometers per pixel, the length of one side of the frames F can be, for example, 25 micrometers corresponding to 500 pixels. Meanwhile, the length of one side of the respective dies D1 to D6 is, for example, several millimeters. In this way, the size of the mesh M is normally considerably finer than the die size. In FIG. 5, the mesh M is illustrated in an expediential manner for easy understanding and the scale thereof may be different from an actual one. It is assumed that the size of the frames F is sufficiently larger than the size (several nanometers to several tens of nanometers, for example) of defects to be detected.

The luminance computing circuit 110 further calculates a difference between the luminance average value of each frame F and a reference value and regards the difference as a deviation of the luminance value in the first pattern P1. The reference value can be, for example, the average value of luminances in the entire region of the first pattern P1. It suffices to store the reference value in the storage 140 in advance. The deviation of the luminance value of each frame F is stored in the storage 140 along with the position coordinates of the relevant frame F.

The luminance computing circuit 110 similarly calculates the luminance average value and the deviation of each of all the frames F in the region of the first pattern P1. In this way, the deviations of the luminance values of all the frames F in the region of the first pattern P1 are obtained.

The deviations of the luminance values of the respective frames F in the entire region of the first pattern p1 are stored in the storage 140 as the luminance deviation map. For example, the deviation of the luminance value of the frame F1 in the die D1 is low and has a negative value, and the deviation of the luminance value of the frame F2 in the die D4 is high and has a positive value. Similarly, the deviation of the luminance value of the frame F3 in the die D3 is low and has a negative value, and the deviation of the luminance value of the frame F4 in the die D6 is high and has a positive value. The luminance deviation map obtained in this manner is used for image correction, which will be explained later. The luminance deviation map can be displayed on the display 150 as needed. When the frames F are finer than the dies D1 to D6, the luminance deviation map is similar to the in-plane luminance distribution illustrated in FIG. 2. Therefore, illustrations of the entire luminance deviation map are omitted here.

Figure 6A:
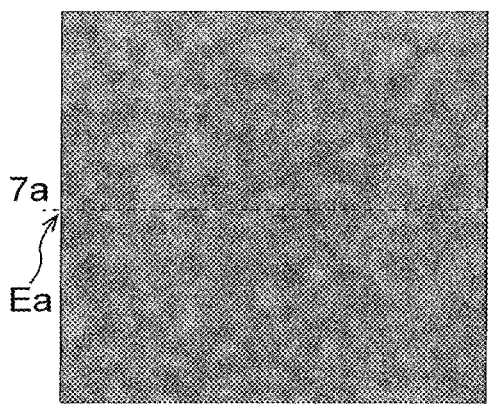
FIGS. 6A and 6B illustrate gray patterns of parts in the die D1 and the die D4 as units for comparison in the luminance deviation map.
Figure 6B:
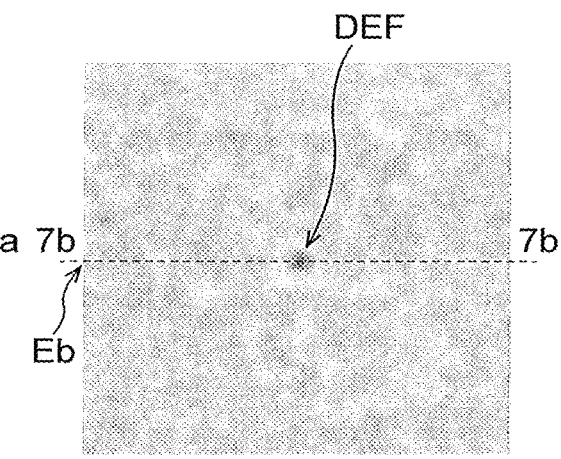
Figure 7A:
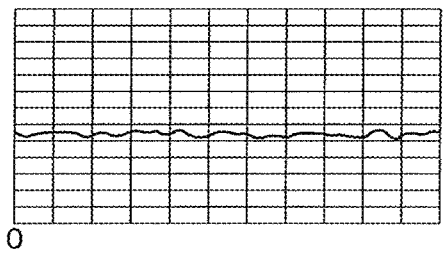
FIGS. 7A and 7B are graphs of the luminance values corresponding to the gray patterns in FIGS. 6A and 6B, respectively.
Figure 7B:

For example, FIGS. 6A and 6B illustrate gray patterns of parts (the frames F1 and F2 illustrated in FIG. 5, for example) in the die D1 and the die D4 as units for comparison in the luminance deviation map. Comparison target parts illustrated in FIGS. 6A and 6B are the frames F1 and F2 corresponding in the dies D1 and D4, respectively. FIGS. 7A and 7B are graphs of the luminance values corresponding to the gray patterns in FIGS. 6A and 6B, respectively. FIG. 7A illustrates the luminance values at positions on a line 7a-7a in FIG. 6A, where the horizontal axis represents the distance from one end Ea of the line 7a-7a. FIG. 7B illustrates the luminance values at positions on a line 7b-7b in FIG. 6B, where the horizontal axis represents the distance from one end Eb of the line 7b-7b. The vertical axes in FIGS. 7A and 7B both represent the luminance value.

As is apparent from FIGS. 6A to 7B, the luminance values of the frame F2 of the die D4 are higher than those of the frame F1 of the die D1 and are closer to those of the white level.

For example, it is assumed that a defect DEF is located on a center portion of the frame F2 as illustrated in FIG. 7B. In this case, the defect DEF appears as an isolated black point in the gray pattern as illustrated in FIG. 6B. Therefore, as illustrated in FIG. 7B, the luminance value of the defect DEF is lower than those of other regions.

However, because the magnitude of the defect DEF to be detected is considerably smaller than the size of the frame F, the influence thereof on the luminance average value of the frame F2 is small. Therefore, the deviation of the luminance value in the region of the first pattern P1 calculated by the luminance computing circuit 110 results from an in-plane deviation of the dimension or the dimensional ratio (the duty ratio, for example) of the repetitive pattern in the region. Accordingly, the luminance deviation map represents the in-plane deviation of the dimension or the dimensional ratio of the repetitive pattern in the region of the first pattern P1. In order to eliminate the influence of the in-plane deviation of the dimension or the dimensional ratio of the repetitive pattern in the defect inspection, the luminance computing circuit 110 corrects the image as at Step S50, which will be explained later.

Referring back to FIG. 3, next, the template TMP is imaged again to perform a comparative inspection (Step S40). At this time, the image capturing system 30 takes an image (a second image) of the same region in the template TMP similarly at Step S20. The image capturing system 30 transmits the image of the template TMP imaged again to the luminance computing circuit 110.

Next, the luminance computing circuit 110 subtracts the deviation based on the luminance deviation map from the luminance value of each of pixels in the frame F (Step S50). This smooths the deviations of the luminance values of the respective frames F. The luminance computing circuit 110 then transmits the corrected gray pattern of the first pattern P1 to the comparison circuit 160.

The luminance computing circuit 110 is explained in more detail below.

The luminance computing circuit 110 receives the image of the first pattern P1 which has been imaged again by the image capturing system 30, from the image capturing system 30. The luminance computing circuit 110 subtracts the deviation of the luminance value in the luminance deviation map from the luminance value of each pixel in the first pattern P1 with respect to each of the frames F. Such a correction of the luminance value of each pixel in the first pattern P1 smooths the gray pattern of the first pattern P1. When the corrected gray pattern is displayed on the display 150, the corrected gray pattern represents more uniform (flatter) luminance values than in the gray pattern before corrected.

Figure 8A:
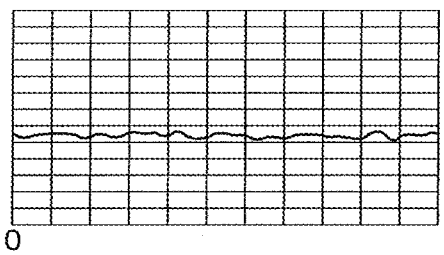
FIGS. 8A and 8B are graphs illustrating the luminance values of corrected gray patterns of the frames F1 and F2, respectively.
Figure 8B:
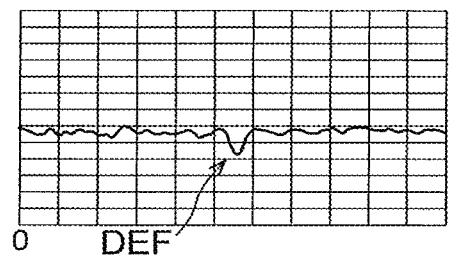

For example, FIGS. 8A and 8B are graphs illustrating the luminance values of corrected gray patterns of the frames F1 and F2, respectively. The luminance values of the corrected gray patterns of the frames F1 and F2 are equal in the average value. Therefore, as illustrated in FIGS. 8A and 8B, the deviations of the luminance values of the respective frames F are smoothed in regions other than the defect DEF.

In the example described above, the luminance computing circuit 110 creates the luminance deviation map and subtracts the deviation of the luminance value in the luminance deviation map from the luminance value of each pixel in the first pattern P1. However, the luminance computing circuit 110 alternatively can calculate correction values by inverting the signs (positive or negative) of the deviations of the luminance values with respect to each of the frames F to create a correction value map. In this case, the correction value map is a complementary map in which the signs of the deviations of the luminance values of the respective frames F of the luminance deviation map are inverted. In this case, it suffices that the luminance computing circuit 110 adds the correction value based on the correction value map to the luminance value of each pixel in the image of the first pattern P1 imaged again. In this way, also by using the correction value map complementary with the luminance deviation map instead of the luminance deviation map, the deviations of the luminance values of the respective frames F can be smoothed.

Referring back to FIG. 3, next, the comparison circuit 160 performs die-die comparison processing using the corrected gray pattern of the first pattern P1 (Step S60). The comparison processing can be, for example, a level-difference comparison system or a differential comparison system, which will be explained later. The comparison circuit 160 compares two dies as comparison targets. At this time, because the first pattern P1 has been already corrected, the dies can be compared in a state including the first pattern P1 and the second pattern P2 mixed.

When the dies are compared and the absolute value of a luminance difference or the absolute value of a differential value of the luminance difference is larger than a threshold (YES at Step S70), the comparison circuit 160 or the control computer 100 determines that the relevant frame has a defect (Step S80). On the other hand, when the dies are compared and the absolute value of a luminance difference or the absolute value of a differential value of the luminance difference is equal to or smaller than the threshold (NO at Step S70), the comparison circuit 160 or the control computer 100 determines that the relevant frame includes no defect (Step S90). The determination result is stored in the storage 140 along with the position coordinates.

The comparison circuit 160 is explained in more detail below.

The comparison circuit 160 performs comparison processing on the image of the first pattern P1 corrected in the manner as described above and detects a defect. The comparison processing is, for example, the die-die comparison method and the level-difference comparison system or the differential comparison system can be used.

In the level-different comparison system, the comparison circuit 160 eliminates a difference between a luminance level (luminance average) of the entire die D1 and the luminance level (luminance average) of the entire die D4 using the corrected gray pattern. Further, when the absolute value of the luminance difference between the luminance of the die D1 and the luminance of the die D4 is larger than a threshold (first threshold), the comparison circuit 160 estimates that there is a defect at the relevant position of the template TMP. The luminance difference of the defect part and the coordinates thereof are stored in the storage 140. It is sufficient to store the threshold in the storage 140 in advance.

In the differential comparison system, after eliminating the difference between the luminance level of the entire die D1 and the luminance level of the entire die D4, the comparison circuit 160 differentiates a luminance difference between the luminance of the die D1 and the luminance of the die D4. Because there is no luminance difference between the die D1 and the die D4 at a position including no defect, the differential value is small. On the other hand, the luminance difference greatly changes between the die D1 and the D4 at a position including a defect and thus the differential value is large in the absolute value. Therefore, when the absolute value of the differential value is larger than a threshold (first threshold), the comparison circuit 160 estimates that there is a defect at the relevant position of the template TMP. The luminance difference (or the differential value) of the defect part and the coordinates thereof are stored in the storage 140. It is sufficient to store the threshold in the storage 140 in advance.

Either the level-different comparison system or the differential comparison system or both thereof can be performed. The comparison circuit 160 can detect a defect using other comparison systems. While the die D1 and the die D4 are compared in the example described above, other dies are compared similarly. The comparison method is not particularly limited. For example, the die D1 can be used as a reference to compare each of the dies D2 to D6 with the die D1. Alternatively, adjacent dies being comparison targets can be changed in turn in such a manner that the dies D1 and D2 are compared with each other, the dies D2 and D3 are compared with each other, . . . .

When the comparison processing for the two dies as the comparison targets ends, one or both of the two dies are changed and the processes at Steps S60 to S90 are performed again (NO at Step S110). When the comparison processing for all the dies in the template TMP ends (YES at Step S110), the inspection of the template TMP ends.

Further, the inspection result is displayed as a defect map on the display 150 (Step S130). For example, it suffices that the display 150 displays the inspection result stored in the storage 140 according to the coordinates. This enables the display 150 to display the position of the defect on the template TMP.

As described above, the inspection apparatus 1 according to the first embodiment images the first pattern P1 of the template TMP and obtains the in-plane luminance distribution from the luminance values of the image of the first pattern P1. The inspection apparatus 1 averages the luminance values with respect to each of the frames F to create the luminance deviation map (or the correction value map) of the first pattern P1. The inspection apparatus 1 images again the first pattern P1 of the template TMP and corrects the image of the first pattern P1 imaged again using the luminance deviation map (or the correction value map). With this correction, the luminance average values of the gray pattern become equal in the dies D1 to D6 as comparison targets. Meanwhile, because the size of a defect to be detected is sufficiently smaller than the size of the frames F, the defect does not affect the luminance deviation map (or the correction value map) so much even when the luminance values are averaged with respect to each of the frames F. Therefore, when correcting the image of the first pattern P1 using the luminance deviation map (or the correction value map), the inspection apparatus 1 can smooth the in-plane deviations of the luminance values of the first pattern P1 while keeping fluctuation in the luminance value due to the defect. Accordingly, the inspection apparatus 1 can easily detect a defect on a non-resolving pattern periodically repeated.

For example, when the luminance average value of the gray pattern of the die D1 and the luminance average value of the gray pattern of the die D4 are to be matched, it is conceivable that a moving average is performed to smooth the luminance difference within a plane of the first pattern P1 or that a weighted average of adjacent plural pixels is performed. However, if the moving average or the weighted average is performed, the luminance of a defect part is also averaged and attenuated. In this case, detection of a defect may become difficult.

In contract thereto, the inspection apparatus 1 according to the first embodiment averages the luminance values in each of the frames F sufficiently larger than a defect, creates the luminance deviation map (or the correction value map), and corrects the luminance values of the image of the first pattern P1 using the luminance deviation map (or the correction value map). Therefore, in the first embodiment, there is no need to perform averaging processing such as the moving average or the weighted average. Accordingly, the inspection apparatus 1 according to the first embodiment can suppress attenuation in the luminance of a defect part and thus can easily detect a defect on the template TMP.

(Mixed Pattern including Resolving Pattern and Non-Resolving Pattern)

Figure 9:
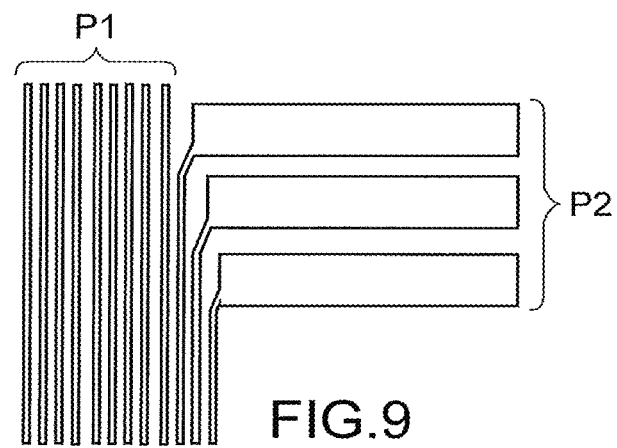
FIG. 9 is a plan view illustrating a part of a template TMP on which a resolving pattern and a non-resolving pattern are mixed.

FIG. 9 is a plan view illustrating a part of a template TMP on which a resolving pattern and a non-resolving pattern are mixed. On a semiconductor chip, a minute structure such as a memory cell region and a structure in which the line width is wide, such as a power source, a sense amplifier, and a driver, are mixed in some cases. In these cases, the template TMP has a mixed pattern including both a non-resolving pattern P1 and a resolving pattern P2 as illustrated in FIG. 9. The non-resolving pattern P1 as the first pattern is a pattern that is unresolvable with the light of the light source of the optical system 20 and the resolving pattern P2 as the second pattern is a pattern that is resolvable with the light of the light source of the optical system 20.

The mixed pattern is also sometimes a repetitive pattern that is periodically repeated. In this case, comparison is performed regarding a unit of repetition of the mixed pattern as a die to inspect both the first pattern P1 and the second pattern P2.

When the mixed pattern is imaged by the image capturing system 30, the image of the non-resolving pattern P1 has luminance values of the gray level and the image of the resolving pattern P2 has an amplitude of the white and black levels. Therefore, if the resolving pattern P2 is corrected similarly to the non-resolving pattern P1, the luminance is decreased or increased, which prevents the die-die comparison from being performed for the resolving pattern P2.

Therefore, the correction using deviations of the luminance values according to the first embodiment is applied to the image corresponding to the non-resolving pattern P1 and is not applied to the image of the resolving pattern P2. Accordingly, the luminance computing circuit 110 extracts the luminance values of the image of the non-resolving pattern P1 from the image of the mixed pattern and then calculates the deviations of the luminance values in the non-resolving pattern P1. Alternatively, the luminance computing circuit 110 eliminates the image of the resolving pattern P2 from the image of the mixed pattern and then calculates the deviations of the luminance values in the remaining non-resolving pattern P1. The calculation method of the deviations of the luminance values can be the same as that described above.

For example, when the resolving pattern P2 is located at outer edge portions of the respective dies D1 to D6 illustrated in FIG. 2, the luminance computing circuit 110 extracts the luminance values of the non-resolving pattern P1 located at central portions of the dies D1 to D6 or eliminates the resolving pattern P2 located at the outer edge portions of the dies D1 to D6 and then calculates the deviations of the luminance values in the non-resolving pattern P1.

The deviations of the luminance values in the non-resolving pattern P1 are used for correction of the non-resolving pattern P1 in an image taken again when the die-die comparison is performed. The correction of the non-resolving pattern P1 is identical to the correction of the image described above. At this time, the second pattern P2 is not corrected.

After the image of the non-resolving pattern P1 is corrected, the comparison circuit 160 performs the die-die comparison of the image. At this time, the comparison is performed in a state including the non-resolving pattern P1 and the resolving pattern mixed. Because the deviations of the luminance values in the non-resolving pattern P1 are already corrected, the non-resolving pattern P1 can be compared along with the resolving pattern P2. The comparison of the image can be performed by either the level-difference comparison system or the differential comparison system described above.

In this way, also for a mixed pattern including the non-resolving pattern P1 and the resolving pattern P2, the inspection apparatus 1 according to the first embodiment can correct only the image of the non-resolving pattern P1 to enable the die-die comparison.

(Second Embodiment)

Figure 10:
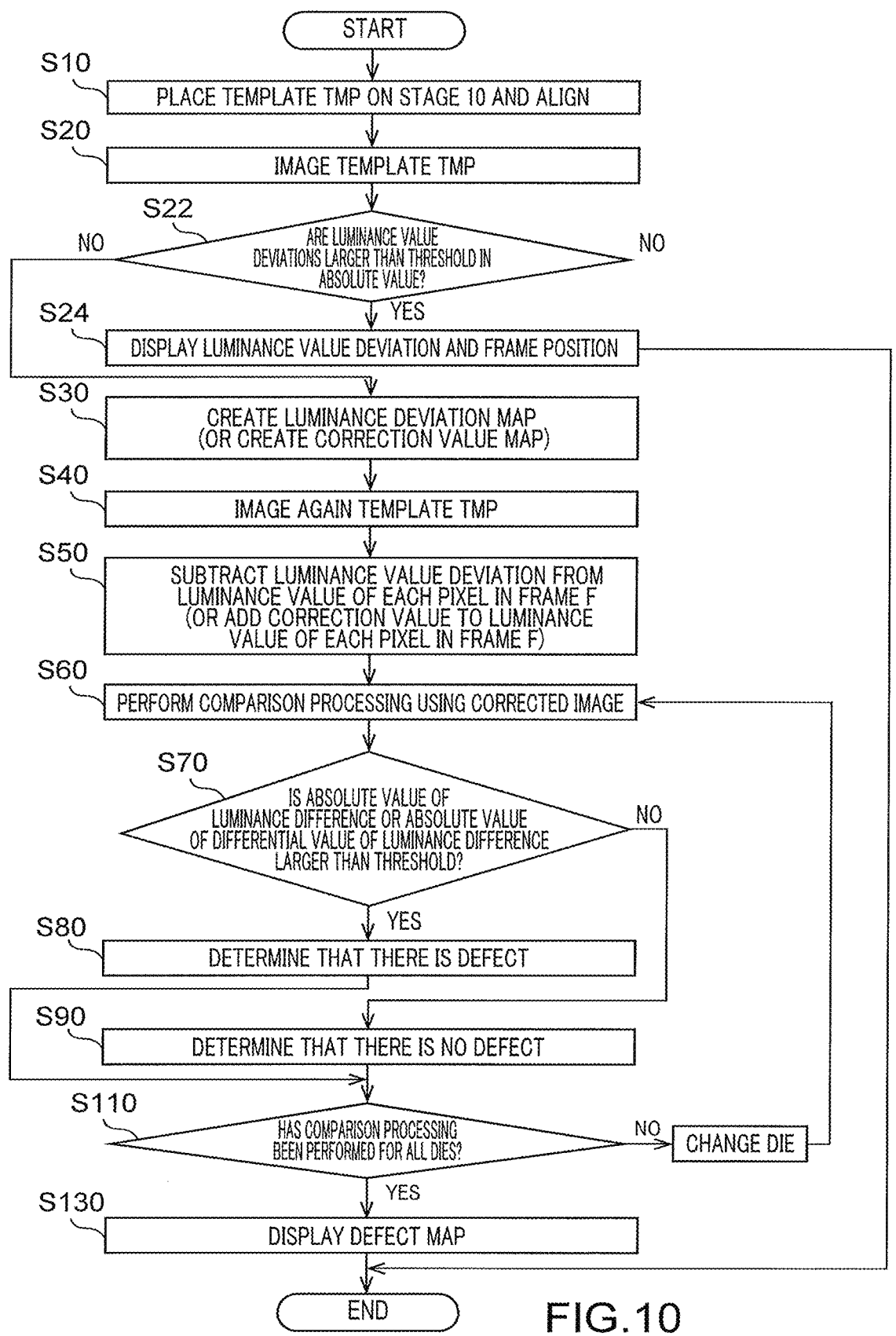
FIG. 10 is a flowchart illustrating an example of an operation of an inspection apparatus according to a second embodiment.

FIG. 10 is a flowchart illustrating an example of an operation of an inspection apparatus according to a second embodiment. The configuration of the inspection apparatus according to the second embodiment can be identical to the configuration of the inspection apparatus according to the first embodiment.

The inspection apparatus 1 according to the second embodiment stops the inspection without performing the correction processing for the image of the first pattern P1 and the comparison processing for dies when the deviations of the luminance values in the first pattern P1 are larger than a threshold (second threshold). Large deviations of the luminance values in the first pattern P1 indicate that the in-plane deviations of the dimension or the dimensional ratio of the first pattern P1 are large. Therefore, when the deviations of the luminance values are considerably large, it can be determined that the template TMP has in-plane deviations exceeding an acceptable value. The inspection apparatus 1 according to the second embodiment then stops the inspection processing when the deviations of the luminance values are larger than the threshold.

For example, after processes at Steps S10 and S20, the luminance computing circuit 110 calculates deviations of the luminance values in the first pattern P1 and compares the deviations of the luminance values with the threshold (S22).

When a deviation of the luminance value of any of frames F in the first pattern P1 is larger than the threshold in the absolute value (YES at Step S22), the luminance computing circuit 110 and the comparison circuit 160 end the processing without performing the processes at Step S30 to S130. In this case, the display 150 displays that the inspection is stopped and also displays the deviation of the luminance value together with the position of the corresponding frame F (Step S24). This enables an operator to know the stop of the inspection and to easily recognize the position where the in-plane deviation is large.

On the other hand, when the deviations of the luminance values of all the frames F in the first pattern P1 are equal to or smaller than the threshold in the absolute value (NO at Step S22), the luminance computing circuit 110 and the comparison circuit 160 perform the processes at Step S30 to S130 similarly in the first embodiment.

In this way, the inspection apparatus 1 according to the second embodiment stops the inspection processing when the deviations of the luminance values in the first pattern P1 are larger than the threshold. This can omit an unnecessary inspection and can reduce the inspection time when the template TMP has a large abnormality.

(Third Embodiment)

Figure 11:
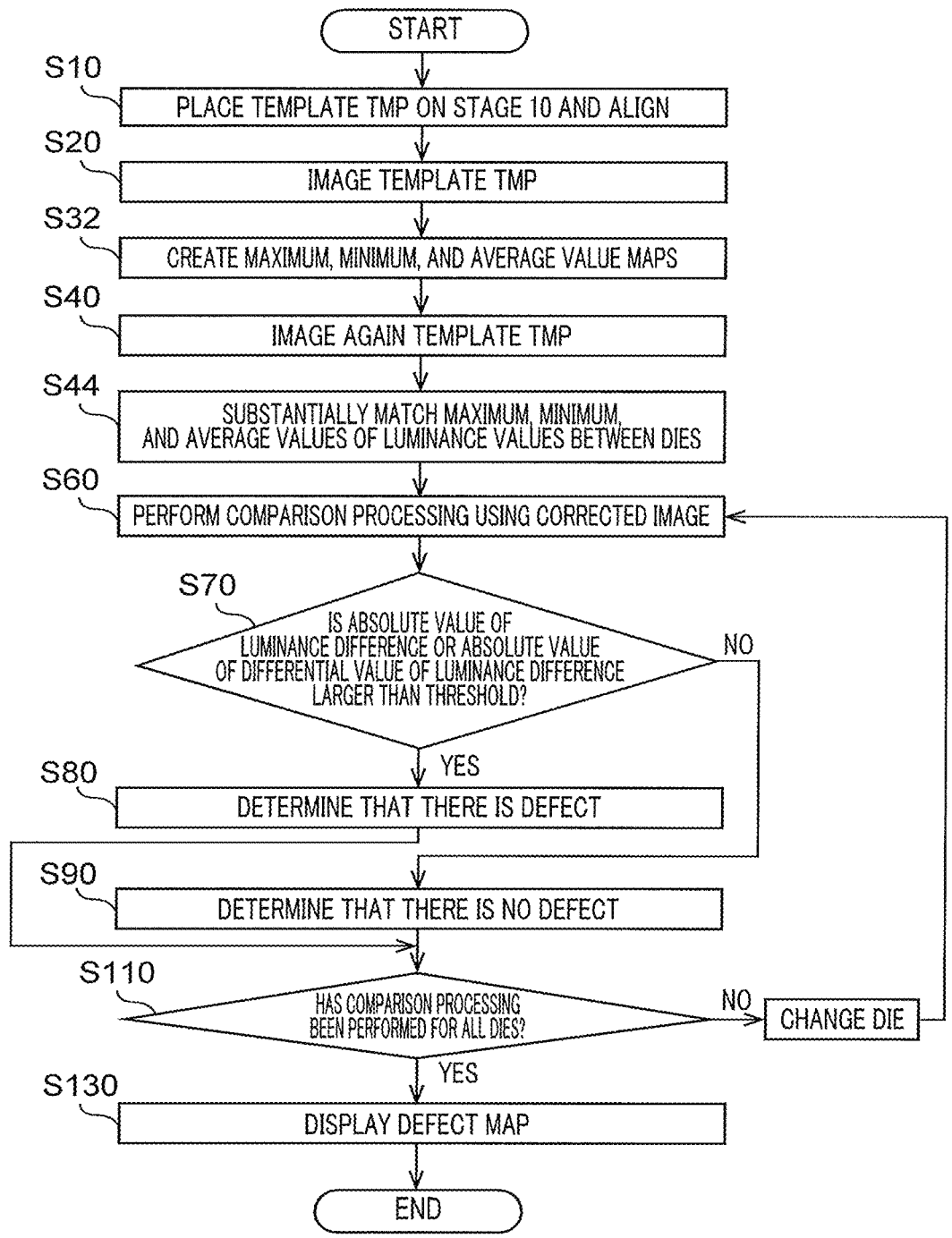
FIG. 11 is a flowchart illustrating an example of an operation of an inspection apparatus according to a third embodiment.

FIG. 11 is a flowchart illustrating an example of an operation of an inspection apparatus according to a third embodiment. The configuration of the inspection apparatus according to the third embodiment can be identical to the configuration of the inspection apparatus according to the first embodiment.

According to the third embodiment, the luminance computing circuit 110 obtains the maximum value, the minimum value, and the average value of the luminance values in the first pattern P1 and corrects the image of the first pattern P1 so as to substantially match the maximum values, the minimum values, and the average values of the luminance values between dies to be compared by the comparison circuit 160. This correction is performed instead of the process at Step S50 (correction using the deviations of the luminance values) in the first and second embodiments.

For example, after performing the processes at Steps S10 and S20, the luminance computing circuit 110 obtains the maximum value, the minimum value, and the average value of the luminance values in the first pattern P1. Maximum, minimum, and average value maps are created in this manner (Step S32). In the case of a mixed pattern, the luminance computing circuit 110 extracts the luminance values of the first pattern P1 from the image and then calculates the maximum, minimum, and average values of luminance values of each die, or eliminates the second pattern P2 from the image and then calculates the maximum, minimum, and average values of the luminance values. The maximum, minimum, and average values of the luminance values are calculated with respect to each die and are calculated for all the dies in the first pattern P1. The maximum, minimum, and average values of the luminance values of each of the dies are stored in the storage 140 along with the position coordinates. The maximum, minimum, and average value maps are thus stored in the storage 140.

Next, after performing the process at Step S40, the luminance computing circuit 110 substantially matches the average values of the luminance values of two dies being the comparison targets in an image of the first pattern P1 imaged again. Furthermore, the luminance computing circuit 110 also substantially matches the respective maximum values and minimum values thereof (Step S44). For example, the luminance computing circuit 110 shifts the luminance values of the entire region of one of the two dies to cause the respective average values of the luminance values of the dies to coincide with each other. Next, the luminance computing circuit 110 calculates the gain (multiplication ratio) of the luminance values to cause the amplitudes of the maximum and minimum values of the luminance values of the two dies to coincide with each other. The luminance computing circuit 110 then multiplies the amplitude from the shifted average value of the luminance values of the correction target die by the calculated gain. In this way, the average values, the maximum values, and the minimum values of the luminance values of the two dies are substantially matched. Alternatively, the luminance computing circuit 110 shifts the luminance values of entire region of one of the two dies to cause the respective average values of the luminance values of the dies to coincide with each other. Next, the luminance computing circuit 110 calculates standard deviations of the luminance values of the two dies and calculates the gain (the magnification ratio) of the luminance values to cause the calculated standard deviations to coincide with each other. The luminance computing circuit 110 then multiplies the amplitude from the shifted average value of the luminance values of the correction target die by the calculated gain. This processing also can substantially match the average values, the maximum values, and the minimum values of the luminance values of the two dies. Thereafter, the inspection apparatus performs the processes at Step S60 and subsequent steps similarly in the first embodiment.

According to the third embodiment, dynamic ranges of two dies being comparison targets become substantially equal. Furthermore, the luminance average values of the two dies being the comparison targets also become equal. Accordingly, the gray levels of the dies are matched to some extent and thus a defect on the template TMP can be easily detected similarly in the first embodiment.

Furthermore, according to the third embodiment, the maximum value, the minimum value, and the average value of the luminance values are calculated with respect to each die without requiring to calculate the deviation of the luminance values with respect to each frame F. Therefore, the maximum, minimum, and average value maps of the third embodiment can be created in a short time and the inspection time can be reduced as compared to that in the first and second embodiments.

The third embodiment can be combined with the second embodiment. In this case, it suffices to perform the processes at Steps S22 and S24 in FIG. 10 between the processes at Step S20 and Step S32 in FIG. 11. Due to this combination, the third embodiment can also achieve the effects of the second embodiment.

(Fourth Embodiment)

The inspection apparatus 1 according to a fourth embodiment sets the pixel size of the image of the template TMP imaged at Step S20 in FIG. 3 larger (coarser) than the pixel size of the image of the template TMP imaged at Step S40. For example, the pixel size of the image of the template TMP is set to about 70 nanometers at Step S20 and the pixel size of the image of the template TMP is set to about 50 nanometers at Step S40.

In an image to be used to create the luminance deviation map (or the correction value map), the luminance values of each frame F are averaged to create the luminance deviation map (or the correction value map). Therefore, as long as the luminance values of each frame F can be averaged, there is no problem if the pixel size of the image of the template TMP imaged at Step S20 is larger (coarser). Meanwhile, the creation time of the luminance deviation map (or the correction value map) can be reduced by setting the pixel size of the image larger (coarser) in this manner.

The configuration and operations of the inspection apparatus 1 according to the fourth embodiment other than those described above can be the same as those in any of the first to third embodiment. Accordingly, the fourth embodiment can also achieve the effects of the first to third embodiments.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. An inspection method comprising:
applying light of a light source to an inspection target;
receiving light from the inspection target to obtain a first image of the inspection target by a sensor;
based on an image of a first pattern comprising repetitive patterns unresolvable with a wavelength of the light source in the first image, calculating a deviation of luminance values with respect to each of first regions in the first pattern by a processor before comparing the repetitive patterns in the image;
obtaining a second image of a same area in the inspection target by the sensor, again;
correcting luminance values of the second image by the processor based on the deviations of the luminance values; and
comparing the repetitive patterns of the corrected second image with each other by a comparer.

2. The method of claim 1, wherein the deviation of the luminance values of each of the first regions is a difference between a luminance average value of each of the first regions in the first image and a luminance average value of the first pattern in the first image.

3. The method of claim 1, wherein correcting luminance values of the second image is subtracting deviations of luminance values of the first pattern from luminance values of the first pattern in the second image.

4. The method of claim 1, further comprising:
calculating correction values by inverting signs of deviations of luminance values in the first pattern,
wherein correcting luminance values of the second image is adding the correction values to luminance values of the first pattern in the second image.

5. The method of claim 1, wherein
the first image comprises the first pattern and a second pattern resolvable with the light of the light source, and
deviations of luminance values in the first pattern are calculated after extracting luminance values of the first pattern from the first image or eliminating the second pattern from the first image.

6. The method of claim 5, wherein
the first and second patterns comprise second regions arranged to be periodically repeated, and
in comparing the repetitive patterns with each other, comparison of each of the first and second patterns is performed with respect to each of the second regions, comparison of the first pattern is performed using the second image corrected, and comparison of the second pattern is performed using the second image uncorrected.

7. The method of claim 1, further comprising:
comparing between luminance of a first repetitive pattern and luminance of a second repetitive pattern in the second image corrected, and determining that the inspection target has a defect when a luminance difference between the first repetitive pattern and the second repetitive pattern or a differential value of the luminance difference is larger than a first threshold.

8. The method of claim 1, wherein a size of the first regions is smaller than that of the repetitive patterns and larger than that of pixels of the sensor.

9. The method of claim 1, wherein the inspection target is determined to have a defect, luminance values of the second image are not corrected, and the repetitive patterns are not compared when the deviations of the luminance values are larger than a second threshold.

10. The method of claim 1, wherein a pixel size of the first Image is larger than that of the second image.

11. An inspection apparatus comprising:
an optical system applying light to an inspection target;
an image sensor receiving light from the inspection target to obtain an image of the inspection target;
a processor calculating, based on a first image of a first pattern comprising repetitive patterns unresolvable with a wavelength of a light source of the optical system in the image of the inspection target, a deviation of luminance values with respect to each of first regions in the first pattern before comparing the repetitive patterns in the image, the processor correcting luminance values of a second image of the inspection target based on the deviations of the luminance values, the second image being an image of a same area in the inspection target; and
a comparer comparing the repetitive patterns of the corrected second image with each other.

12. The apparatus of claim 11, wherein the deviation of the luminance values of each of the first regions is a difference between a luminance average value calculated for each of the first regions and a luminance average value of the first pattern in the first image.

13. The apparatus of claim 11, wherein correcting luminance values of the second image of the inspection target is subtracting deviations of luminance values of the first pattern from luminance values of the first pattern in the second image of the inspection target, or adding correction values obtained by inverting signs of the deviations of the luminance values of the first pattern to the luminance values of the first pattern in the second image.

14. The apparatus of claim 11, wherein further comprising:
a storage storing therein deviations of luminance values of the first pattern or correction values obtained by inverting signs of the deviations of the luminance values of the first pattern along with positional information.

15. The apparatus of claim 11, wherein
the first image of the inspection target comprises the first pattern and a second pattern resolvable with the light of the light source, and
the processor calculates deviations of luminance values in the first pattern after extracting luminance values of the first pattern from the first image of the inspection target or eliminating the second pattern from the first image of the inspection target.

16. The apparatus of claim 11, wherein the processor and the comparer do not correct the luminance values of the second image of the inspection target, determine that the inspection target has a defect, and do not compare the repetitive patterns when the deviations of the luminance values are larger than a second threshold.

* * * * *